3,277,043
PROCESS TO OBTAIN PHENOLIC SOLVENT SOLUBLE POLYCARBONAMIDE-IMIDES AND SOLUTIONS THEREOF
Fred F. Holub, Scotia, N.Y., assignor to General Electric Company, a corporation of New York
No Drawing. Filed Dec. 26, 1963, Ser. No. 333,757
9 Claims. (Cl. 260—33.4)

This invention relates to synthetic polymers, their method of preparation and use of these compositions as electrical insulation, especially as a dielectric or insulation on electrical devices, e.g., capacitors, motors, generators, conductors, etc. More particularly, this invention relates to synthetic resins which are the reaction product of carbonyldiphthalic anhydrides and diamines, to their method of manufacture and to their use in electrical insulation. The synthetic resin compositions of this invention more specifically comprise the reaction product of at least one carbonyldiphthalic anhydride and at least one diamine selected from the group consisting of $C_{2-8}$ alkylenediamines, m-phenylenediamine and diamines having the formula

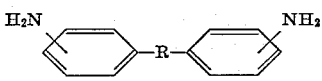

where R is one of the divalent radicals selected from the group consisting of $C_{1-3}$ alkylene,

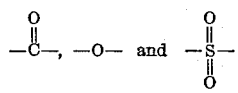

Synthetic resins prepared by the reaction of dianhydrides of tetracarboxylic acids with diamines are valuable synthetic resins which have been prepared from various tetracarboxylic acid dianhydrides and various diamines. The most widely used dianhydride has been pyromellitic dianhydride. Preferably the reaction is carried out in the presence of a non-reactive solvent for both the reactants and the polymeric acid amide. The initial product of these reactants is the opening of the two anhydride rings and addition of the one amine group to each anhydride group with the formation of a polymeric amide-acid which on further heating loses water to close the ring between the amide group of the polymer and the adjacent carboxylic groups to produce a polymeric imide. If the latter reaction proceeds too far, the polymer precipitates from the reaction mixture and generally becomes too insoluble and the temperature required to shape it becomes too high to permit it to be used. Because of this latter reaction, it has been found necessary up to this time to react the tetracarboxylic acid dianhydride with the diamine to obtain the initial polymeric acid-amide at temperatures no higher than 60° C. This polymeric acid-amide remains soluble in the reaction solvent which permits it to be used as a coating solution or the polymer can be isolated by precipitation or evaporation of the solvent to recover the still soluble, fusible resin. After shaping the polymer or coating a substrate, the polymer is readily converted to the polyimide form by chemical or thermal means to produce products having excellent solvent resistance and resistance to flow at elevated temperatures.

One factor which has prevented wide use of these polymeric materials has been the fact that very expensive solvents, e.g., N-methyl-2-pyrrolidone, N,N-dimethylacetamide, etc., have had to be used in order to carry out the reaction and also to provide solutions which allow the polymer to be applied to various surfaces. Since these solvents are lost or recovered only at considerable cost, the high cost of the final product, due both to the cost of the solvent and the high cost of the dianhydride, has restricted the use of these materials to applications requiring their unique properties. I have now found that carbonyldiphthalic anhydrides have the unique property that they will react with certain diamines in inexpensive and readily available solvents. Furthermore, this reaction can be carried out even at elevated temperatures to produce soluble, resinous products extremely rapidly without any danger of the reaction proceeding to the insoluble polyimide stage.

The solvents which I have found to be extremely useful are phenol, the various cresols, e.g., ortho-, meta- and para-cresol, the various xylenols, e.g., 2,3-xylenol; 2,4-xylenol; 2,5-xylenol; 2,6-xylenol; 3,4-xylenol; 3,5-xylenol, etc.; and the halogenated derivatives thereof, e.g., mono-, di, tri-, tetra-, pentahalophenols; mono-, di-, tri- and tetrahalocresols, and the mono-, di- and trihaloxylenols, wherein the halogen is chlorine, bromine, or iodine. Of the halogenated phenols, I prefer the chlorophenols, chlorocresols, and chloroxylenols, generally as the monochloro derivative, especially o-chlorophenol which is a liquid at room temperature. However, since the solvent is finally evaporated in use, and since the halogenated phenols are more expensive than the non-halogenated phenols, I prefer to use the non-halogenated phenols, e.g., phenol, the cresols, and xylenols.

Since some of these phenols are solid at room temperature, and therefore would cause the polymer solutions to solidify when cooled to room temperature, one might think that such phenols would not be useful as solvents. However, I have found that, surprisingly enough, these phenols may be diluted with various liquids which themselves are not solvents for the polymer, but will keep the phenol liquid at room temperature without destroying the solvent power of the phenol. The only requirement for such a diluent is that it be miscible with the phenol to form liquid solutions when used in minor amounts so as to not destroy the solvent power of the phenol, that it be non-reactive with the polymer-forming reactants and that it have a boiling point sufficiently high that it does not distill from the reaction mixture while attaining the desired polymer-forming reaction temperature. Suitable diluents are the various aromatic hydrocarbons, e.g., toluene, the various xylenes, the aromatic hydrocarbons and hydrogenated aromatic hydrocarbons made from petroleum, etc. Such diluents can be used in amounts up to about 20–25% by weight of the specified phenols. I have found that the use of such diluents is sometimes desirable since their use generally gives a less viscous solution for a given percentage of polymer in the solution.

Likewise, mixtures of various phenols remain liquid at room temperature, although one or more of the various phenols in the mixture are solid at room temperature. Commercially available cresol from coal tar is a mixture of isomers which is liquid at room temperature and is an ideal solvent for my process. Therefore, I can use either those phenols which are liquid at room temperature, or by mixing those phenols which are solid at room temperature with other phenols or with diluents, I can use such phenols as solvents for the reaction medium, since after cooling to room temperature they remain as liquid solvents for the polymer, thus permitting the solutions to be used as liquid coating or casting compositions, e.g., as wire enamels, impregnants for fibrous materials, casting of films, etc., without further modification. If desired, the polymer may be precipitated and used as a molding or extrusion compound with or without the addition of dyes, fillers, pigments, etc.

The various diamines which I have found useful for reacting with the carbonyldiphthalic anhydrides are the various alkylenediamines, especially those in which the alkyl group contains from 2 to 8 carbon atoms, e.g., ethylenediamine, propylenediamine, butylenediamine, 2-methylpropylenediamine, 1,2-diaminobutane, pentamethylenediamine, hexamethylenediamine, heptamethylenediamine, octamethylenediamine, etc. Of the various diaminobenzenes, only m-phenylenediamine will give polymers with the carbonyldiphthalic anhydrides which are soluble in the phenolic solvents. Of the various binuclear diamines, only those diamines in which one amino group is on each of the phenyl groups and the phenyl groups are separated by an alkylene, carbonyl, oxygen or sulfonyl radical will give polymeric products with carbonyldiphthalic anhydrides which are soluble in the phenolic solvents. Typical examples of such diamines are the various isomeric ortho-, meta- and para-oxydianilines, e.g., 2,2'-oxydianiline, 3,3'-oxydianiline, 4,4'-oxydianiline, 2,3'-oxydianiline, 2,4'-oxydianiline, 3,4'-oxydianiline, etc., the alkylenedianilines, especially those in which the alkylene group has from 1 to 3 carbon atoms, e.g., methylenedianiline, ethylidenedianiline, ethylenedianiline, propylidenedianiline, propylenedianiline, etc., including the various ortho-, meta- and para-isomers thereof, the various ortho-, meta- and para-isomers of diaminobenzophenone, and the various ortho-, meta- and para-isomers of sulfonyldianiline. Of these diamines, m-phenylenediamine, ethylenediamine, hexamethylenediamine, 4,4'-oxydianiline, 4,4'-methylenedianiline, and 4,4'-sulfonyldianiline are the most readily available. The alkylenediamines generally produce polymeric imides with the carbonyldiphthalic anhydrides which have lower softening points and less resistance to oxidation at elevated temperatures than the polyimides prepared from the aromatic diamines listed above. Therefore, where such properties are required I prefer to use the aromatic diamines.

The carbonyldiphthalic anhydrides which I may use are 3,3'-carbonyldiphthalic anhydride, 3,4'-carbonyldiphthalic anhydride and 4,4'-carbonyldiphthalic anhydride. The carbonyldiisophthalic acids and carbonylditerphthalic acids cannot be used, because although they form the polymeric amide-acid, they cannot be cyclicized to the polymeric imide. To form the latter, the amide and carboxyl groups of the polymeric acid-amide must be on adjacent carbon atoms of the benzene nucleus. In addition, the carbonyldiphthalic acids cannot be used in place of the anhydrides. This is because the reaction with the diamine is an addition reaction with the anhydride and a condensation reaction with the acid. The addition reaction occurs extremely rapidly, in fact almost as soon as the reactants are dissolved in the phenolic solvent, e.g., 2 to 5 minutes at temperatures of 100–125° C. On the other hand, the condensation reaction occurs only slowly at higher temperatures, even after the reactants are completely dissolved, e.g., 45–60 minutes at 170–200° C., and requires the removal of the water formed in the condensation reaction. At these temperatures and conditions which permit the removal of water, the cyclicization reaction to form the polymeric imide also proceeds resulting in a product which precipitates from the solution. Furthermore, some of the adjacent carboxyl groups each condense with separate amino groups resulting in a branched polymer rather than the linear polymer, which rapidly becomes an infusible, gelled polymer. It is difficult, if not almost impossible, under these conditions, to obtain a useful polymer. Because of this latter reaction, it is desirable to use anhydrous reagents, solvents and dry atmosphere for carrying out the reaction to prevent any conversion of the anhydride groups to carboxyl groups.

Of these various dianhydrides, the most readily available and preferred dianhydride is 4,4'-carbonyldipthalic anhydride, sometimes named 3,3',4,4'-benzophenone tetracarboxylic acid dianhydride. These anhydrides may be made by the oxidation of two adjacent methyl groups to an anhydride group and the connecting alkylene group of bis-(dimethylphenyl)alkanes, to the carbonyl group, as described in U.S. 3,078,279—McCracken et al., or by a similar oxidation of the tetramethylbenzophenones.

In forming my polymeric products, it is only required to mix one or more of the carbonyldiphthalic anhydrides, with one or more of the above-named amines and heat them in the presence of the liquid phenolic solvent. Although the anhydride and diamine are not soluble at room temperature, as the temperature is raised to 100 to 160° C., they go into solution rapidly and appear to react almost instantaneously to produce a viscous polymeric solution, which remains liquid and homogeneous when cooled to room temperature. Even with no further heating the polymer has an intrinsic viscosity of 0.3–0.8 at room temperature measured in cresol. Further heating in this temperature range further increases both the viscosity of the solution and intrinsic viscosity of the polymer. Higher temperatures can be used but offer no advantage since the reaction is so rapid in the above cited range. If desired, an inert atmosphere, e.g., nitrogen, can be used in the reaction vessel to impede oxidation of the amines and to produce lighter colored polymers. Since the stoichiometric proportions are 1 mole of amine to 1 mole of the dianhydride, I prefer to use essentially equimolar amounts of the dianhydride and diamine, although slight excess, e.g., 1.05 moles of either the anhydride or amine to 1 mole of the other may be used. When a slight excess of either reactant is used, the intrinsic viscosity of the resulting polymer is lower than when equimolar amounts are used. Such a technique can be used to control the molecular weight of the polymer. Monoamines such as aniline, p-aminobiphenyl, benzylamine, or anhydrides of a dicarboxylic acid such as phthalic anhydride or maleic anhydride or other reagents reactive with amines or carboxylic acids may be used to chain-stop or modify the polymers. These may be added at the start, during or at the end of the polymer forming reaction and may be used to react with the slight excess of either the diamine or dianhydride used initially.

The amount of phenolic solvent used should be sufficient to produce a homogeneous solution with the reactants and polymer and yet not be too viscous to handle easily. If too much solvent is used no benefit is gained to offset the cost of the additional solvent which is lost in applying the resin to a substrate. Optimum concentrations are in the range of 5–25% by weight polymer to 75–95% by weight solvent, based on end-use.

In order that those skilled in the art may better understand my invention, the following examples are given by way of illustration and not by way of limitation. All percentages are by weight unless otherwise stated.

*Example 1*

A mixture of 6.44 g. of 4,4'-carbonyldiphthalic anhydride, 2.16 g. of m-phenylenediamine, and 40.0 g. of distilled cresol (mixture of isomers from coal tar) is slowly heated to 140° C. with stirring over a 20-minute period, at which time the solution is clear and somewhat viscous. On cooling to room temperature, the solution remains clear and fluid although somewhat more viscous. The polymer has an intrinsic viscosity of 0.31 measured in cresol at 25° C.

A sample of the solution when cast upon a glass plate and slowly heated to 350° C. produces a light yellow, clear, tough, flexible film which is easily stripped from the glass plate.

Insulated electrical conductors are readily prepared using this polymer solution diluted to 5% polymer content with additional cresol. Both nickel-plated copper wire and plain copper wire 50 mils in diameter when coated with 3 coats of this polymer solution with each coat being cured 3 minutes at 300° C. produce at 0.6–0.7 mil build (0.3–0.35 mil thick film) insulation on the wire. These insulated electrical conductors can be readily wound on a mandrel having a diameter equal to the diameter of the wire without any failure of the coating. On heating the wound wire for 1 hour at 250° C., no failure occurs in the insulation, i.e. there are no cracks, fissures, or crazing when inspected under a magnification of 10. The nickel-coated wire can additionally be heated for 16 hours at 300° C. and still be bent, wound around a mandrel having a diameter equal to the diameter of the wire, without failure of the insulation. Copper appears to catalyze the conversion of the polymer so that the insulation on copper is more rigid and not as flexible as on nickel-plated copper or aluminum wire. When two crossed conductors insulated with the polymer are heated under a 1 kg. load, no cut-through of the insulation occurs up to a temperature of 400° C. which permits the flow of current at a 110 volt A.C. potential between the two wires.

When the above polymer preparation is repeated with half of the stated amounts and 0.3 g. of acetic anhydride and 0.05 g. of pyridine are added after the polymer has cooled to room temperature, no difference is noted in the properties of insulated electrical conductors prepared with the solution over those obtained without the addition of the acetic anhydride and pyridine, thus indicating that the heating steps are as effective as the acetic anhydride and pyridine in converting the amide-acid groups of the polymer to cyclic imide groups.

Likewise, equally good polymers are obtained when equivalent amounts of 4,4'-diaminobenzophenone is substituted for an equivalent amount of the m-phenylenediamine. However, when p-phenylenediamine is substituted for the m-phenylenediamine, only a heterogeneous solution is obtained which produces a crumbly film when cast on a glass plate.

*Example 2*

A mixture of 2.0 g. of 4,4'-oxydianiline, 3.22 g. 4,4'-carbonyldiphthalic anhydride and 20.0 g. of distilled cresol are slowly heated over a 10-minute period to 125° C. to give a clear, viscous polymer solution. The polymer be comes homogeneous before a temperature of 125° C. is reached. On cooling to room temperature, a clear, homogeneous very viscous polymer solution is obtained.

This polymer solution like the polymer solution of Example 1 is readily cast to produce clear, tough, flexible films and produces satisfactorily insulated electrical conductors. One remarkable feature noted in the insulated electrical conductors of Examples 1 and 2 is that they can be heated for as long as 32 hours at 300° C. with essentially no change in weight, indicating that this insulation is capable of withstanding high temperatures for long periods of time.

When this example is repeated using 4.176 g. 4,4'-carbonyldiphthalic anhydride, 2.631 g. 4,4'-oxydianiline and 61.05 g. cresol and heating slowly with stirring on a 130° C. hot plate over a 40-minute period under nitrogen, the reactants dissolve and the solution becomes clear and viscous before the reactants reach the temperature of the hot plate. With no further reaction, the solution remains clear. The polymer has an intrinsic viscosity of 0.73 measured at 25° C. in cresol. A very fluid, homogeneous solution is obtained by diluting the solution to 6% polymer concentration with petroleum hydrocarbon (Solvesso 150) to give a solvent composition having 86% cresol, 14% hydrocarbon. Aluminum, nickel-plated copper and bare copper wire coated with three coats of the solution as decribed above in Example 1 give insulated conductors having cut-through values exceeding 400° C. and have excellent aging properties at temperatures as high as 300° C.

When the preparation of the polymer of Example 2 is repeated substituting an equivalent amount of pyromellitic dianhydride for the 4,4'-carbonyldiphthalic anhydride, the mixture remains heterogeneous although heated from 25 to 175° C. over a period of 30 minutes. Adding addition cresol and heating an additional 10 minutes at 175–195° C. still produces a heterogeneous suspension of solid in the cresol. Attempts to cast such a suspension on a glass plate yield only a solid, crumbly mass instead of the tough, clear, flexible film. Likewise, when the equivalent amount of 4,4'-diaminobiphenyl is substituted for the 4,4'-oxydianiline and heated to 190–200° C. over a 30-minute period, a heterogeneous polymer suspension is obtained which has no film forming properties.

*Example 3*

A mixture of 3.22 g. of 4,4'-carbonyldiphthalic anhydride, 20.0 g. distilled cresol and 2.49 g. 4,4'-sulfonyldianiline are heated over a 20-minute period to 135° C. to produce a clear, viscous solution which remains homogeneous on cooling to room temperature. A clear, flexible film is obtained by casting the solution on a glass plate and heating to 300° C. for 5 minutes.

*Example 4*

A mixture of 2.0 g. 4,4'-oxydianiline, 1.08 g. m-phenylenediamine, 6.44 g. 4,4'-carbonyldiphthalic anhydride and 40.0 g. distilled cresol are slowly heated to 160° C. over period of 30 minutes to produce a clear, homogeneous viscous solution. After the solution had cooled to 100° C., 0.45 g. α-hydroxyquinoline was added to see whether or not the effect of this antioxidant could be detected in the properties of an insulated conductor. When this solution is used to coat nickel-plated copper wire as described in Example 1, no difference in the aging properties of the insulation can be detected over the properties of the insulated conductors obtained in Example 1 except that the cut-through temperature was 390° C., showing that the effect of preparing a copolymeric composition by the use of two amines is to lower somewhat the softening temperature of the final polymeric film.

*Example 5*

When 6.44 g. of 4,4'-carbonyldiphthalic anhydride is added to a solution of 1.20 g. of ethylenediamine in 30.0 g. distilled cresol, an exothermic reaction occurs, heating the solution to 50° C. On heating the solution further to 125° C. over a period of 10 minutes, the solution becomes clear and remains homogeneous when cooled to room temperature. When this solution is spread evenly on a glass plate and heated to 150° C. over a period of 20 minutes, a clear, yellow, flexible film is obtained.

When this example is repeated, but using an equivalent amount of hexamethylenediamine in place of the ethylenediamine, upon mixing of the ingredients a clear, viscous solution is obtained when the solution is heated to 125° C. over a period of 10 minutes. This solution when spread on a glass plate and heated over a period of 10 minutes to 175°–200° C. produces a yellow, flexible film. Addition of acetone to a portion of the solution precipitated the polymer as a powder. The dried, isolated polymer is moldable at 350° C. under pressure to produce a clear, tan molded part. Substitution of pyromellitic anhydride for the 4,4'-carbonyldiphthalic anhydride in the reaction with hexamethylenediamine in a cresol solution produces a non-homogeneous solution even when heated to as high a temperature as 195° C. Furthermore, this solution does not become viscous nor does it produce a film on evaporation of the solvent.

*Example 6*

A mixture of 4.0 g. 4,4'-methylenedianiline, 6.44 g. 4,4'-carbonylphthalic anhydride and 40.0 g. distilled cresol are heated to 140° C. over a period of 10 minutes to give a homogeneous, viscous solution. On cooling to room temperature, the solution remained clear even after the addition of 5 g. aromatic hydrocarbon obtained from petroleum (Solvesso 150). This solution, diluted to 7% polymer with cresol, when used to coat nickel-plated copper wire, aluminum wire, and plain copper wire as described above in Example 1, gave insulated conductors having cut-through temperatures in excess of 400° C.

On repeating this example, but including the hydrocarbon diluent in the initial reaction mixture, no detectable effect was produced on the solubility of the composition or the polymeric films prepared from the solution. The solution when cast on a glass plate and heated over a period of 20 minutes to 250° C. produces a clear, yellow, flexible film. Likewise, the substitution of 20 g. of o-chlorophenol, a mixture of 10.0 g. of cresol and 10.0 g. 2,6-xylenol, and a mixture of 15.0 g. cresol and 5.0 g. xylene likewise produces satisfactory polymeric solutions when substituted for the cresol solvent.

Infrared analysis of the film prepared by casting a solution of the polymer on a sodium chloride crystal and heating over a period of 30 minutes to 100–120° C. under nitrogen to evaporate essentially all of the solvent showed strong absorption at 3.1 microns showing the presence of amide groups. However, on further heating over a period of 14 minutes at 300° C., the absorption at 3.1 micron region disappeared showing that the amide groups were converted into the imide group.

A copolymeric composition obtained by replacing 50% of the 4,4'-methylenedianiline with an equivalent amount of hexamethylenediamine produces a viscous polymeric solution which likewise is cast on a glass plate producing a flexible film by slowly heating to 250° C. Similar results are likewise obtained when 3,3'-carbonyldiphthalic anhydride and 3,4'-carbonyldiphthalic anhydride are substituted for the 4,4'-carbonyldiphthalic anhydride. However, when attempts are made to substitute 4,4'-carbonyldiphthalic acid for the 4,4'-carbonyldiphthalic anhydride, no satisfactory polymeric composition can be obtained. When cresol is used as the solvent, the solution, although originally becoming clear at 160° C., is not viscous even after heating to 170° C. Further heating to 200° C. over a period of 30 minutes produces a hazy solution which is only slightly viscous. Further heating increases the non-homogeneity of the solution and the resin gels, almost as soon as the solution becomes viscous. In this reaction, the reaction vessel is equipped to permit distillation of the water as it formed. When xylene is used to azeotropically distill the water of condensation from the reaction mixture, a non-homogeneous solution is likewise obtained. In neither case can a clear, flexible film be cast from the solution.

Although the utility of the polymer solutions of my invention have been described principally in terms of electrical applications or as flexible films, it should be understood that these polymers may be used in all other applications suitable for such compositions. Thus, these resins can be employed as insulation over wire previously coated with another polymer, or vice versa, to give laminated, insulated coatings on the wire to improve the properties of the insulation. They may also be used as dipping varnishes to impregnate coils of previously insulated wire, i.e., in the motor and generator rotors, field coils, etc. These resins may also be used in molding powder formulations, by mixing with various fillers, for example, wood flour, diatomaceous earth, carbons, silica, abrasive grains, e.g., carborundum, diamond grit, etc. These polymers are also useful in preparing fibers, as impregnants, and bonding materials for metallic and fibrous laminates, etc. The polymers in film form are suitable as a dielectric in making capacitors, as slot insulation in motors, etc.

In the foregoing discussion and examples, various modifications have been disclosed. Obviously, other modifications and variations of the present invention are possible in light of the above teachings. It is therefore to be understood that changes may be made in the particular embodiments of the invention described which are within the full intended scope of the invention as defined by the appended claims.

What I claim as new and desire to secure by Letters Patent of the United States is:

1. The process of making a heat-curable liquid coating composition which comprises reacting, under initially substantially anhydrous conditions, (a) at least one carbonyldiphthalic anhydride directly with (b) at least one diamine selected from the group consisting of $C_{2-8}$ alkylenediamines, m-phenylenediamine and diamines having the formula

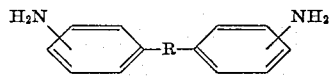

where R is one of the divalent radicals selected from the group consisting of $C_{1-3}$ alkylene,

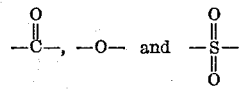

in the presence of at least one phenolic solvent selected from the group consisting of phenol, cresols, xylenols, halogenated phenol, halogenated cresols and halogenated xylenols, the reaction mixture being heated to a temperature, not exceeding about 160° C., sufficient to cause the reactants to go into solution and the solution to remain liquid and homogeneous when cooled to room temperature.

2. The process of claim 1 wherein the carbonyldiphthalic anhydride is 4,4'-carbonyldiphthalic anhydride.

3. The process of claim 1 wherein the diamine is m-phenylenediamine.

4. The process of claim 1 wherein the diamine is 4,4'-oxydianiline.

5. The process of claim 1 wherein the diamine is 4,4'-methylenedianiline.

6. The process of claim 1 wherein the diamine is 4,4'-sulfonyldianiline.

7. The process of claim 1 wherein the diamine is ethylenediamine.

8. The process of claim 1 wherein the diamine is hexamethylenediamine.

9. The product produced by the process of claim 1.

References Cited by the Examiner

UNITED STATES PATENTS 3,179,634   4/1965   Edwards.
3,190,856   6/1965   Lavin et al. _____ 260—65

MORRIS LIEBMAN, *Primary Examiner.*

J. E. CALLAGHAN, *Assistant Examiner.*